(12) United States Patent
Likar et al.

(10) Patent No.: US 8,565,106 B2
(45) Date of Patent: Oct. 22, 2013

(54) ITERATIVE LOCALIZATION TECHNIQUES

(75) Inventors: Bojan Likar, Ig (SI); Robert Posel, Ljubljana (SI); Andreas Kalagasidis, Ljubljana (SI); Tomaz Javornik, Grosuplje (SI); Gorazd Kandus, Ljubljana (SI); Mihael Mohorcic, Ljubljana (SI); Ales Svigelj, Lavrica (SI); Janez Bester, Zg.Besnica (SI); Andrej Kos, Blejska Dobrava (SI); Miha Smolnikar, Trzin (SI)

(73) Assignee: Accelera Mobile Broadband, Inc., Santa Clara, CA (US)

( * ) Notice: Subject to any disclaimer, the term of this patent is extended or adjusted under 35 U.S.C. 154(b) by 544 days.

(21) Appl. No.: 12/825,048

(22) Filed: Jun. 28, 2010

(65) Prior Publication Data

US 2011/0317570 A1    Dec. 29, 2011

(51) Int. Cl.
*G01R 31/08*    (2006.01)
*H04W 4/00*    (2009.01)
*H04W 40/00*    (2009.01)

(52) U.S. Cl.
USPC .......... 370/252; 370/330; 455/426.1; 455/446

(58) Field of Classification Search
USPC ............. 370/252, 338; 455/404.2, 446, 456.1
See application file for complete search history.

(56) References Cited

U.S. PATENT DOCUMENTS

| 6,404,388 | B1 | 6/2002 | Sollenberger et al. |
| 6,459,903 | B1 | 10/2002 | Lee |
| 6,515,623 | B2 | 2/2003 | Johnson |
| 2009/0305710 | A1* | 12/2009 | Johnson et al. ............... 455/446 |
| 2011/0130135 | A1* | 6/2011 | Trigui ........................... 455/423 |
| 2011/0287778 | A1* | 11/2011 | Levin et al. ................ 455/456.1 |

* cited by examiner

*Primary Examiner* — Brandon Renner
(74) *Attorney, Agent, or Firm* — Van Pelt, Yi & James LLP

(57) ABSTRACT

The present invention refers to iterative localization techniques with wireless communication systems for rural environment with limited number of base stations in the range of the mobile station and urban environment with multipath propagation channel and several base stations in the range of mobile station.

12 Claims, 5 Drawing Sheets

ITERATIVE LOCALIZATION TECHNIQUES

BACKGROUND OF THE INVENTION

1. Field of the Invention

The present invention refers to iterative localization techniques with wireless communication systems for rural environment with limited number of base stations in the range of the mobile station and urban environment with multipath propagation channel and several base stations in the range of mobile station.

2. Description of the Related Art

Localization awareness becomes an important system functionality of existing and emerging wireless communication systems in order to provide location based services, such as location based advertisements, location based social networking such as Facebook, MySpace, i.e. and for emergency to rescue of people (U.S. Pat. No. 6,404,388). On the other hand, the localization awareness is important additional system functionality for wireless network providers to improve their networks applying adaptive methods for network reconfiguration according to the instant spatial distribution of the users and verify the coverage prediction obtained by coverage prediction software tools. The localization methods have been reported in several previous works and they can be generally classified into three main groups, namely (i) methods based on angle of arrival (AOA), (ii) method based on time of arrival (TAO) for example in U.S. Pat. No. 6,459,903, (iii) methods based on time difference of the arrival (TDOA), (iv) received signal strength (RSS) techniques and finally (v) combination of mentioned techniques, for example as proposed in (U.S. Pat. No. 6,515,623).

Generally, with some exceptions, the proposed methods does not consider the limitations of the particular communication system such as, (i) does mobile station estimate the TOA of one or more base stations, (ii) does mobile station measure RSS of one or more base stations, (iii) does mobile station measure the DTOA, and the most important does mobile station send the measured data to the location server located somewhere on the network.

In addition, the available location base methods relay on the assumptions that the base station receives signal from more than two base stations, which may be true in dense populate urban environment fully covered by wireless networks. However, in a rural environment, in many cases the mobile terminal receives two or less base stations. The usage of the classical localization method in the circumstance is not possible, so for the usage of location services in rural area a new innovative methods are necessary, specially invented for a particular communication system, for example WiMAX, GSM, LTE, etc. In addition to mentioned drawbacks the majority of available methods, in particular those based on TOA, AOA and TDOA, assume line of sight propagation between transmitter and receiver, which is not true at all especially in urban and indoor propagation environment, where the radio propagation is mainly characterized by: reflection, refraction and diffraction. If in the multipath propagation environment several base stations are observed by mobile terminal, the mobile terminal, in order to increase the accuracy of the position calculation, have to select those base stations, which channel characteristic is close to line of sight channel. Though the channel estimation is implemented in nearly all mobile wireless communication systems, only RSS and time difference between serving and neighboring base stations is reported to the localization server, which limits the use of well known localization methods.

Thus there exists a need for new localization techniques for emerging communication system for rural environment with limited number of base stations in the range of the mobile station and urban environment with multipath propagation channel and several base stations in the range of mobile station. At the moment, there are two communication systems foreseen for next generation of the mobile communication systems, namely LTE and WiMAX. While the LTE is in its infancy several mobile WiMAX products are successfully installed in some countries also in remote rural areas. Therefore there exists a huge need for new localization methods, which do not require any changes in radio WiMAX protocol but on other hand finds location of the mobile WiMAX terminal in a rural or urban area when at least two base stations are in range of mobile stations.

A WiMAX standard specifies procedures for network topology acquisition which also includes the MS scanning of the neighbor base stations that is primarily applied for handover procedure. However, the data from the scanning procedure can be applied also for estimation of the mobile station location. The scanning procedure starts with MOB-SCN-RSP message sent from serving base station to the mobile station defining the scanning interval. The BS responds with the MOB-SCN-REP message which among other includes (i) the CINR measured by the MS from the particular BS with the resolution of 0.5 dB, (ii) Received Signal Strength Indicator (RSSI) measured by the MS from the particular BS with the resolution of 0.25 dB in the range from −103.75 dBm to the −40 dB, (iii) relative delay which denotes the delay of neighbor DL signals relative to the serving BS measured by the MS for the particular BS, which value is expressed as a signed integer in units of samples and (iv) round trip delay (RTD) measured by the MS from the serving BS expressed and measured in resolution of 1/sampling frequency. The sampling frequency is function of the bandwidth given as floor (sampling factor*bandwidth/8000)*8000, where sampling factor depending on bandwidth can be 8/7 or 28/25. For example, the sampling frequency for the bandwidth equal to 10 MHz, the sampling frequency is equal 11.2 MHz. The data from the MOB-SCN-REP message can be forwarded through ASN server to the location server, where the location of the base station can be calculated by proposed invention.

BRIEF SUMMARY OF THE INVENTION

The present invention refers to iterative localization techniques with wireless communication systems for rural environment with limited number of base stations in the range of the mobile station and urban environment with multipath propagation channel and several base stations in the range of mobile station. Said method for mobile station location estimation in the WiMAX communication systems comprising the following steps:

a) WiMAX MS measurement of the received signal strength of at least two base stations, where the base station one is the serving base station;

b) WiMAX MS measurement of relative delay which denotes the propagation delay difference between serving base station (BS1) and non-serving base station (BS2);

c) Sending the measured data to the location server;

d) Calculation of the area of MS locations based on relative delay applying time difference of arrival method;

e) Bounding the area of MS locations applying received signal strength value of non-serving BS and its approximation of the antenna diagram using $\cos^n$ approximation, antenna tilt and azimuth applying angle of arrival method;
f) Estimation of the approximation of the MS location applying center of gravity calculation for the area of MS locations assuming uniform distribution of the weight over area;
g) Calculation of the weight distribution for the area of MS locations from the predicted coverage of the area with radio signal from BS1;
h) Estimation of the new approximation of MS location considering previous approximation and calculated center of gravity in step g;
i) Calculation of the weight distribution for the area of MS locations from the predicted coverage of the area with radio signal from BS2;
j) Estimation of the new approximation of MS location considering previous approximation and calculated center of gravity in step i;
k) Criteria for exit from the iterative loop;
l) A method for determining the new area of MS locations.

BRIEF DESCRIPTION OF THE FIGURES

Iterative localization techniques according to the invention will be described in details hereinafter with references to the accompanying figures, wherein.

DETAILED DESCRIPTION OF THE INVENTION

Figure 1:
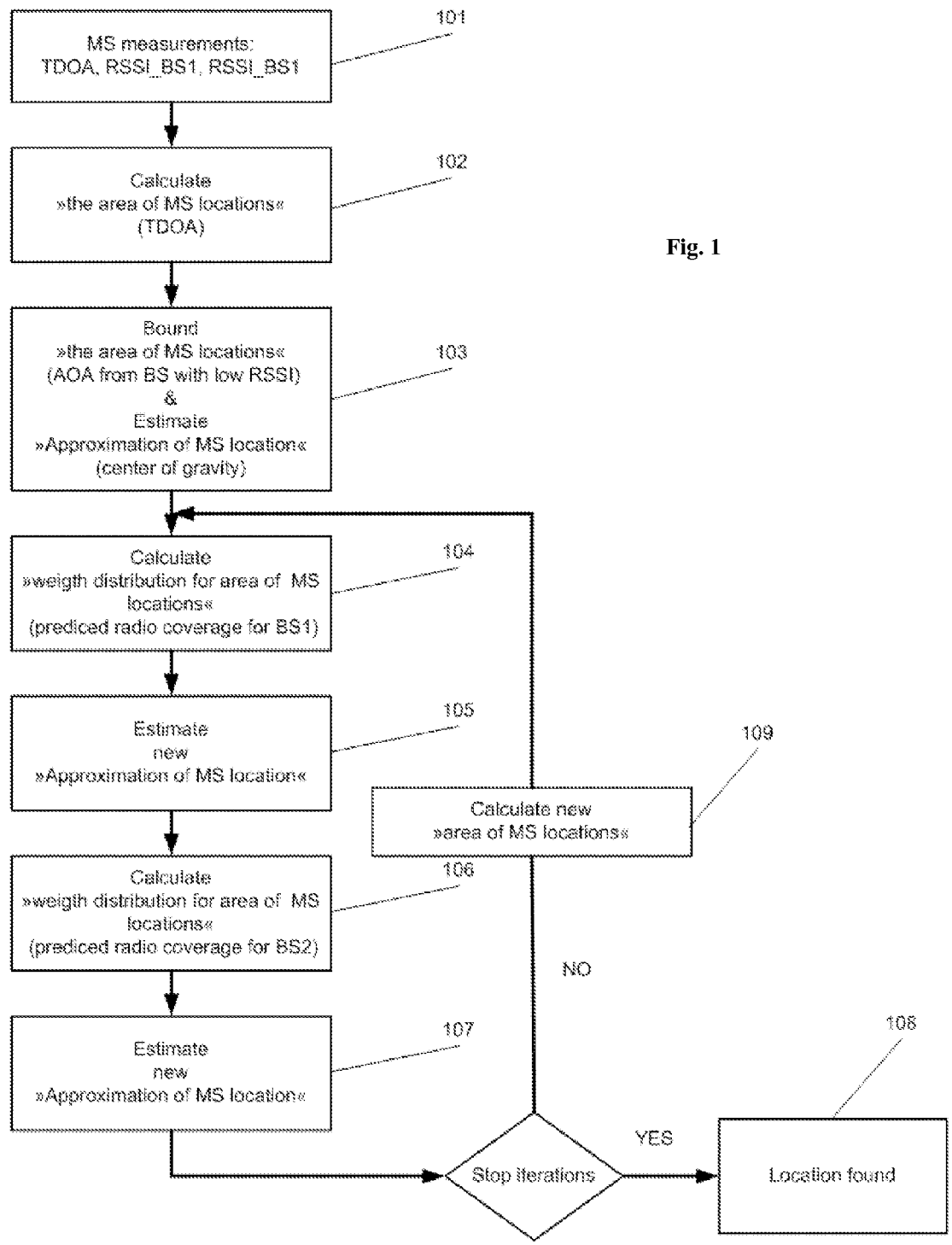
FIG. 1 shows the high level block diagram of the localization method according to the present invention.
Figure 2:
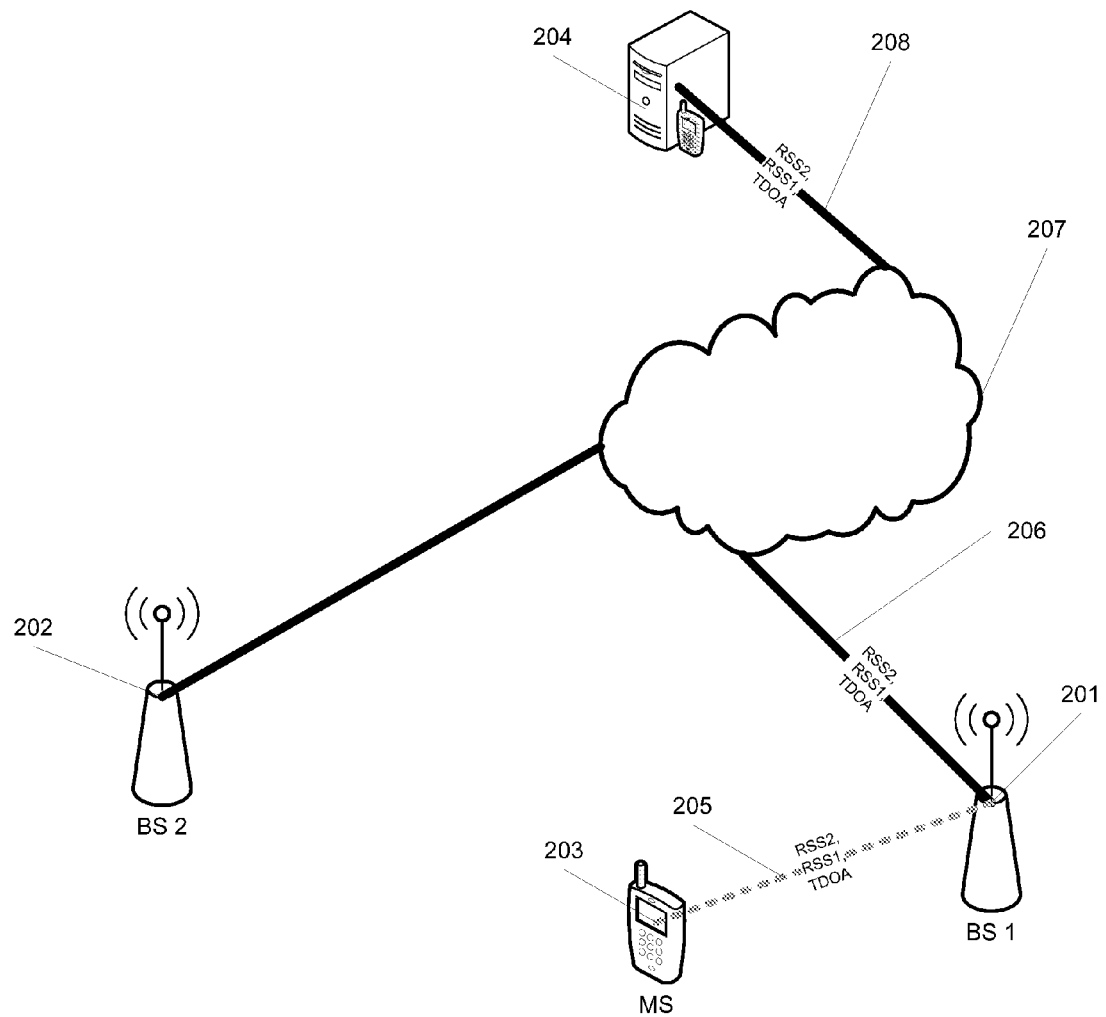
FIG. 2 shows the method according to the present invention utilizing minimal network structure consisting of two base stations, mobile station and location server, and communication links with information relevant for said method.

The goal of the presented invention is to determine a location of the WiMAX mobile station, based data from MOB-SCN-REP message namely the measurement of the received signal strength from at least two WiMAX base stations and difference in time of arrival (DTOA) from those two base stations, angle of arrival of the BS with the lower measured RSS value, the pre-calculated signal strength for specific area applying any tool for radio coverage prediction.

We assume the positions of the WiMAX base stations, their antenna diagrams, tilt and azimuth of the main antenna beams are perfectly known at the localization server. All base stations are perfectly synchronized, which can be achieved either using GPS receivers or Ethernet. The predicted coverage of area by radio signal is also known at the location server.

The method starts (101) with the measurement of the received signal strength of the all base stations the range and difference in time of the arrival between serving base station and other base stations in the range as specified in IEEE 802.16 standard. The measured information is transferred to serving base station and via internet backbone the location server (204).

The proposed algorithm implemented in location server uses measured data of two base stations, either because only two base stations (201,202) are in range of mobile station MS (203) or only two base stations are selected from the set of base stations in the range of mobile station. According to the standard, the WiMAX mobile station (203) measure RSS from base station in range (201,202), in particular WiMAX base station 1—BS1 (201) (RSS1) and WiMAX base station 2 BS2 (202) (RSS2) and the Time difference arrival (TDOA), relative delay, from base station BS2 (202) and base station BS1 (202). Without loss of generality we can assume the RSS value from BS1 (201) is higher than RSSI value of BS2 (202). In majority of cases the BS1 is also serving BS, but this is not necessary. The mobile station sends the measured data, namely RSS1, RSS2 and DTOA via wireless (206), through internet backbone (207) and wired connection (208) to the localization server (204), which is located somewhere at the network.

Figure 3:
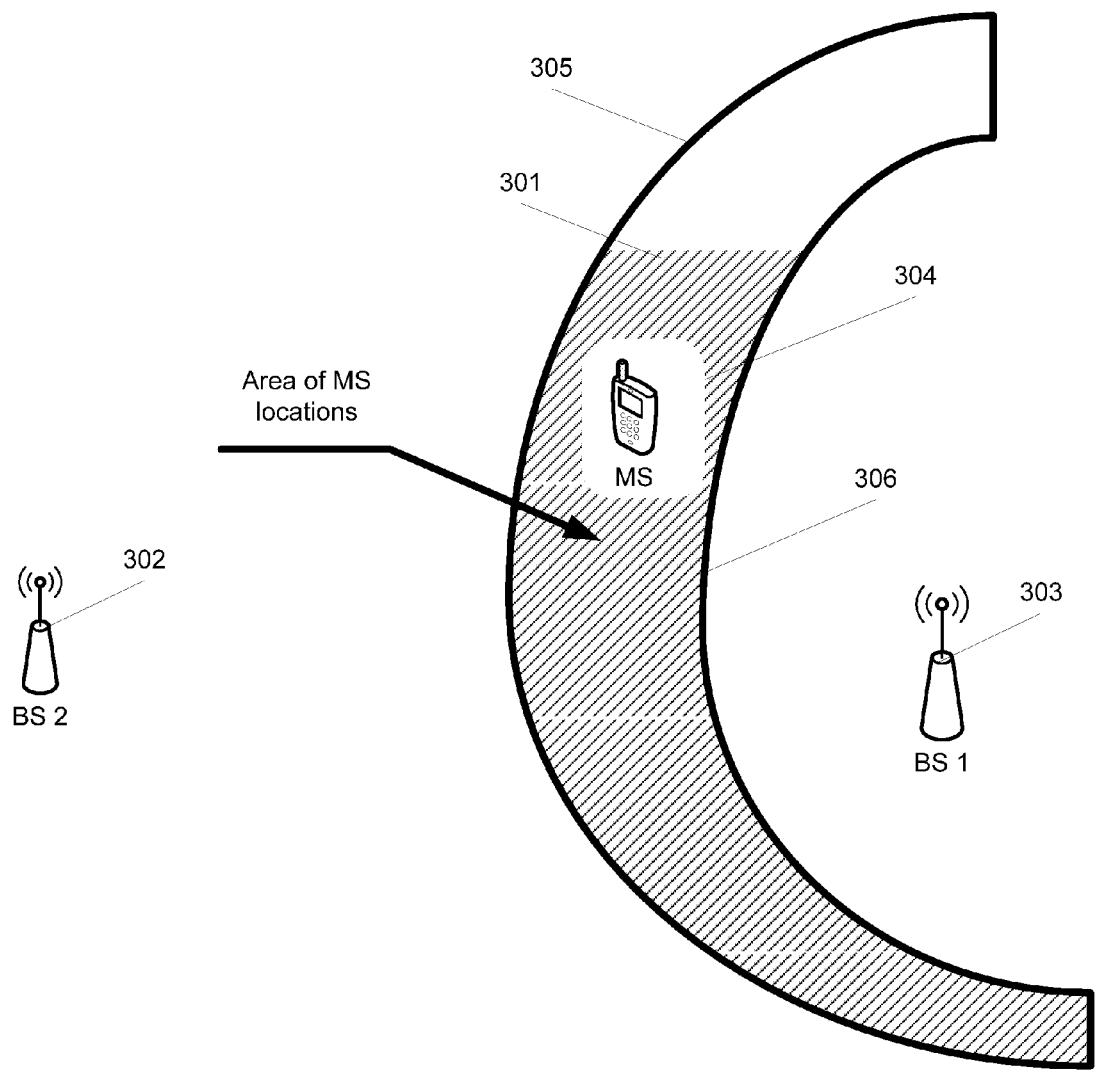
FIG. 3 shows the area of MS locations which is estimated by the TDOA method using measurement at MS.

In the next step (102), the localization server (204) based on the DTOA calculates the area of expected MS locations (301). The area of MS locations (301) is an area limited by two hyperbolas (305,306), as is illustrated in FIG. 3. The hyperbolas are obtained considering the maximum and minimum value of expected DTOA. The area surface depends on the precision of the DTOA estimation and the propagation conditions. For example in WiMAX with 10 MHz bandwidth the precision of the DTOA is approximately 0.1 microseconds, the area of expected MS locations is approximately 27 m wide. The non line of sight (NLOS) propagation conditions generally introduce errors in DTOA estimation. Due to the longer path of the radio ray the area where the MS can be located becomes wider. The additional width of the area can be roughly estimated as a difference between the length of the direct and reflected ray, which can be typical urban environment approximated as a street width, thus the initial width of the area is equal to the width due to precision of DTOA estimation plus the width due to NLOS propagation conditions. The area of MS locations is unlimited so in order to bound the area of MS locations, the data available from BS2 such as antenna azimuth, antenna gain and RSS2 is brought in calculation in next step applying AOA approach (103).

Figure 4:
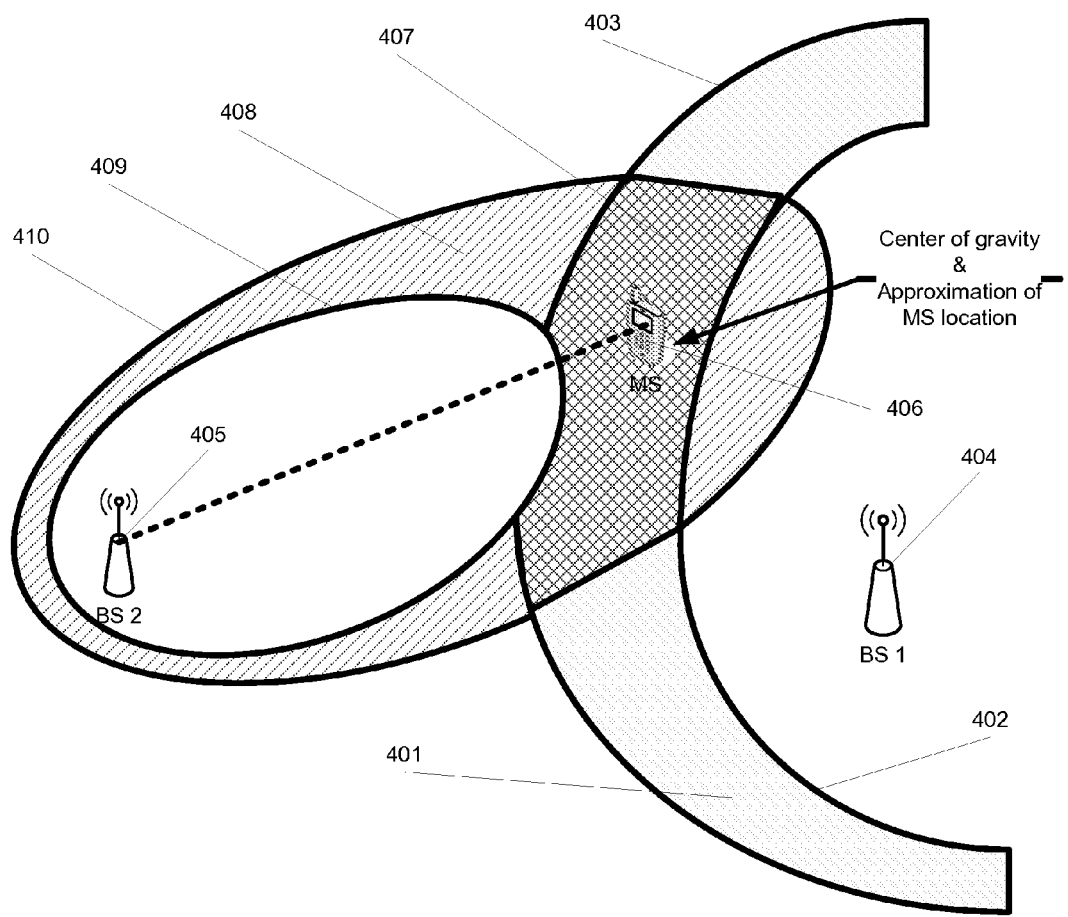
FIG. 4 shows the method of limiting the area of MS locations calculated by the method of the TDOA applying the method base on AOA.

It is obvious studying the shape of the hyperbolas (305, 306,402,403) that the BS with the higher RSS value (303, 404), i.e. BS1 is in the concave part of the plane bounded by hyperbolas. In order to limit the hyperbolic strip of MS locations (301,406) the data about the low RSS value and antenna azimuth of BS2 (405) is considered. In the example in FIG. 3 the MS (304) measured smaller RSS value from BS2 (302). Assuming the exponential path loss model, with the exponent which is the same as applied in the path loss channel model to predict area coverage by radio signal and directional antenna at the BS2 two curves (409,410) around BS2 can be plotted. The curve roughly represents the BS antenna diagram considering its azimuth and tilt. A simple $\cos^n(theta)$, where theta is the antenna azimuth, is applied to model antenna directivity. The exponent n can be estimated from the actual antenna diagram. Two curves are assumed in order to show possible errors in path loss calculations, i.e. the value of exponent, precision measurement of RSSI and additional attenuation due penetration loss in buildings. Though the beam width of BS antennas is usually not extremely narrow (408), this curves roughly limit the area of MS locations. The area (407) is illustrated in FIG. 4. Next the first approximation of MS location (406) is estimated by calculating the center of gravity of the obtained shape assuming uniform distribution of weight across the shape. The approximation of the MS location is not precise, due to wide beam width of BS2 antenna, multipath propagation, shadowing and errors in channel path loss prediction etc.; however it gives us a first estimate about the location of MS, the basic direction.

In the next step (104), a new weight distribution across the area of MS locations is calculated from the measured RSS1 and predicted signal strength by following algorithm:

For each point in the area of MS locations (407) calculate square error between measured RSS1 and predicted RSS.

Normalize the calculated square error by mean square error of the area of MS locations. The obtained values represent a new weight distribution.

Calculate the center of gravity applying a new weight distribution (406,501).

Figure 5:
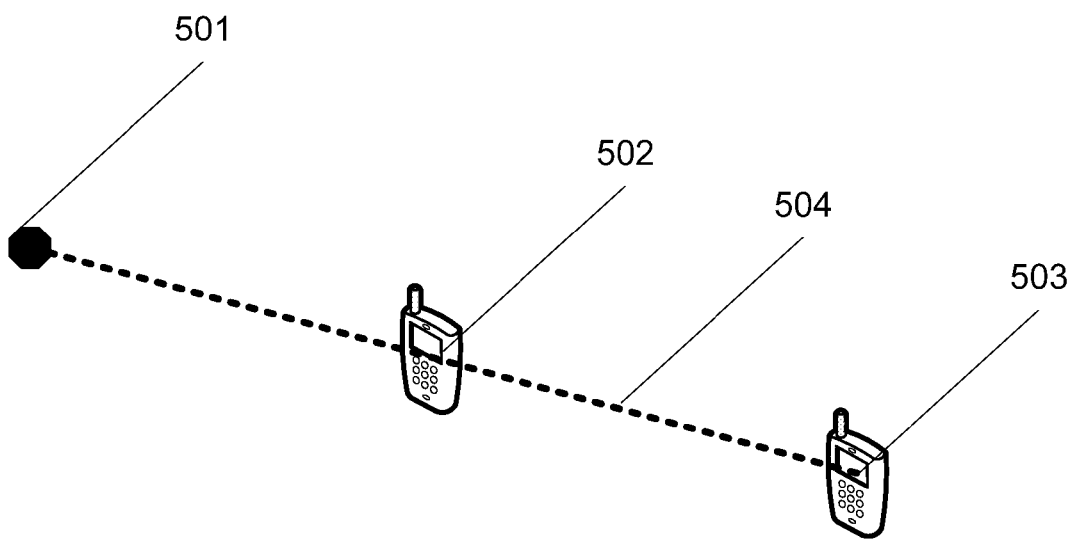
FIG. 5 shows the method of new estimation of the MS location based on last calculated center of gravity and previous estimation of MS location.

The calculated center of gravity (501), in general, differs from previously calculated approximation of MS location (503). The new approximation of MS location (502) is calculated in the next step (105). It is obtained as a point on the line (504) connected the existing approximation of MS location (503) and calculated center of gravity (502) obtained from BS1 applying the following equation:

Approx. of MS location=Old approx. of MS location*
($N$)/($N$+1)+Center of gravity/($N$+1), where N represents the number of center of gravity calculations applying RSS measurement which are involved in approximation of MS location. For example, if we calculate center of gravity from AOA and applying weighted distribution from BS1, N=1, and the point is midpoint on the line which connects the old approximation obtained AOA method and center of gravity obtained from BS1 as depicted in FIG. 5. The proposed weighting is introduced, in order to guarantee the equal contribution of all RSS measurements to the final approximation.

The same procedure is repeated for data predicted data from BS2 and RSS2, where in the following step (106) the estimation of MS location is calculated based on RSS2:

For each point in the area of MS locations (407) calculate square error between measured RSS2 and predicted RSS for the point of interest.

Normalize the calculated square error by mean square error of the area of MS locations. The obtained values represent a new weight distribution.

Calculate the center of gravity applying a new weight distribution (406,501).

The calculated center of gravity (501), in general, differs from previously calculated approximation of MS location (503). The new approximation of MS location (502) is calculated in next step (107). It is obtained as a point on the line (504) connected the existing approximation of MS location (503) and calculated center of gravity (502) obtained from BS1 applying the following equation:

Approx. of MS location=Old approx. of MS location*
($N$)/($N$+1)+Center of gravity/($N$+1).

If three calculation of gravity center is used (form AOA, BS1 and BS2) the value of N is equal to 2.

If RSS values from other BSs are available we can repeat the procedure involving other base stations repeating the same procedure for all base stations in range of MS.

After considering all RSS measurements from all base stations in range the procedure can be finished (108) or the algorithm can enter in iterative loop by calculating new area of MS locations (109). If the maximum distance MS location and arbitrary calculated center of gravity is greater compared to the required precision of the MS location the algorithm enter in the new iteration.

The new area of location is determined as a sphere with center at the approximation of MS location and with the radius, which is determined as a follows:

For each calculate center of gravity calculate its distance to the approximation of the MS location Find the maximal distance multiply it by lambda which results into circle radius.

Reset N=1.

After several iterations, the maximal difference between center of gravity and estimated BS location become smaller and consequently the area of MS locations becomes smaller which results in more precise location of the MS.

In order to prevent the algorithm to end at the local minimum the principle of simulated annealing is applied and define lambda as a random variable with uniform distribution in range between 1 and 3.

The invention claimed is:

1. A method for mobile station (MS) location estimation in the Worldwide Interoperability for Microwave Access (WiMAX) communication systems comprising the following steps:

a) WiMAX MS measurement of received signal strength of at least two base stations, where base station one is a serving base station (BS1);

b) WiMAX MS measurement of a relative delay which denotes a propagation delay difference between the BS1 and a non-serving base station (BS2);

c) Sending data corresponding to the WiMAX MS measurements to the location server;

d) Calculation of an area of MS locations based on relative delay applying time difference of arrival method;

e) Bounding the area of MS locations applying received signal strength value of the BS2 and its approximation of an antenna diagram using $\cos^n$ approximation, antenna tilt and azimuth applying angle of arrival method;

f) Estimation of an approximation of the MS location applying center of gravity calculation for the area of MS locations assuming uniform distribution of the weight over area;

g) Calculation of a weight distribution for the area of MS locations based at least in part on radio signal from BS1;

h) Estimation of a new approximation of MS location considering a previous approximation and a calculated center of gravity in step g;

i) Calculation of a weight distribution for the area of MS locations based at least in part on radio signal from BS2;

j) Estimation of a new approximation of MS location considering a previous approximation and a calculated center of gravity in step i;

k) exiting from the iterative loop based at least in part on a predetermined criteria; and l) determining a new area of MS locations.

2. The method according to claim 1, wherein said new MS location is calculated as a center of gravity for the area of MS locations.

3. The method according to claim 1, wherein the criteria is a maximal distance from a set of distances from the approximation of said new MS location and each center of gravity calculated in the last iteration.

4. The method according to claim 1, wherein the new area of MS locations is calculated as a sphere the radius thereof being proportional to a maximal distance from a set of distances from the approximation of said new MS location and each center of gravity calculated in the last iteration.

5. The method according to claim 2, wherein the weight distribution of the area is calculated as a normalized square error between measured received signal strength and predicted RSS for the point of interest and normalized by a mean square error for the area of MS locations.

6. The method according to claim 4, wherein the proportional factor for the area radius is obtained as a random number from an interval between 1 and 3 and a probability density function of the random process is uniform.

7. A system for mobile station (MS) location estimation in a Worldwide Interoperability for Microwave Access (WiMAX) communication system, comprising:
  an interface receiving and sending communication signals; and
  a processor configured to perform the following steps:
  a) WiMAX MS measurement of received signal strength of at least two base stations, where base station one is a serving base station (BS1);
  b) WiMAX MS measurement of a relative delay which denotes a propagation delay difference between the BS1 and a non-serving base station (BS2);
  c) Sending data corresponding to the WiMAX MS measurements to the location server;
  d) Calculation of an area of MS locations based on relative delay applying time difference of arrival method;
  e) Bounding the area of MS locations applying received signal strength value of the BS2 and its approximation of an antenna diagram using $\cos^n$ approximation, antenna tilt and azimuth applying angle of arrival method;
  f) Estimation of an approximation of the MS location applying center of gravity calculation for the area of MS locations assuming uniform distribution of the weight over area;
  g) Calculation of a weight distribution for the area of MS locations based at least in part on radio signal from BS1;
  h) Estimation of a new approximation of MS location considering a previous approximation and a calculated center of gravity in step g;
  i) Calculation of a weight distribution for the area of MS locations based at least in part on radio signal from BS2;
  j) Estimation of a new approximation of MS location considering a previous approximation and a calculated center of gravity in step i;
  k) exit from the iterative loop based at least in part on a predetermined criteria; and
  l) determining a new area of MS locations.

8. The system according to claim 7, wherein said new MS location is calculated as a center of gravity for the area of MS locations.

9. The system according to claim 7, wherein the criteria is a maximal distance from a set of distances from the approximation of said new MS location and each center of gravity calculated in the last iteration.

10. The system according to claim 7, wherein the new area of MS locations is calculated as a sphere the radius thereof being proportional to a maximal distance from a set of distances from the approximation of said new MS location and each center of gravity calculated in the last iteration.

11. The system according to claim 8, wherein the weight distribution of the area is calculated as a normalized square error between measured received signal strength and predicted RSS for the point of interest and normalized by a mean square error for the area of MS locations.

12. The system according to claim 10, wherein the proportional factor for the area radius is obtained as a random number from an interval between 1 and 3 and a probability density function of the random process is uniform.

* * * * *